(12) United States Patent
Bastioli et al.

(10) Patent No.: US 8,809,423 B2
(45) Date of Patent: Aug. 19, 2014

(54) BIODEGRADABLE MATERIAL FOR INJECTION MOLDING AND ARTICLES OBTAINED THEREWITH

(75) Inventors: Catia Bastioli, Novara (IT); Angelos Rallis, Novara (IT); Roberto Lombi, Novara (IT)

(73) Assignee: Novamont S.p.A., Novara (IT)

( * ) Notice: Subject to any disclaimer, the term of this patent is extended or adjusted under 35 U.S.C. 154(b) by 455 days.

(21) Appl. No.: 12/518,749

(22) PCT Filed: Dec. 11, 2007

(86) PCT No.: PCT/EP2007/063732
§ 371 (c)(1), (2), (4) Date: Jun. 11, 2009

(87) PCT Pub. No.: WO2008/071712
PCT Pub. Date: Jun. 19, 2008

(65) Prior Publication Data
US 2010/0016470 A1    Jan. 21, 2010

(30) Foreign Application Priority Data
Dec. 12, 2006  (IT) .............. MI2006A2374

(51) Int. Cl.
| | | |
|---|---|---|
| C08L 3/00 | (2006.01) | |
| C08L 89/00 | (2006.01) | |
| D21H 19/58 | (2006.01) | |
| D21H 19/54 | (2006.01) | |
| D06M 15/11 | (2006.01) | |
| C08L 29/04 | (2006.01) | |
| D21H 21/14 | (2006.01) | |
| C08L 31/04 | (2006.01) | |
| D21H 19/18 | (2006.01) | |
| C08L 3/02 | (2006.01) | |
| C08K 5/00 | (2006.01) | |
| A23K 1/00 | (2006.01) | |
| A23K 1/18 | (2006.01) | |

(52) U.S. Cl.
CPC . *C08L 3/02* (2013.01); *C08L 29/04* (2013.01); *C08L 31/04* (2013.01); *C08K 5/0016* (2013.01); *A23K 1/003* (2013.01); *A23K 1/1846* (2013.01)
USPC ................ 524/47; 524/52; 524/53; 524/503; 524/524

(58) Field of Classification Search
CPC ........ A23K 1/003; A23K 1/1846; C08L 3/02; C08L 29/04; C08L 2666/04; C08L 31/04; C08K 5/0016
USPC ................. 524/47, 52, 53, 503, 524
See application file for complete search history.

(56) References Cited

U.S. PATENT DOCUMENTS 5,462,981 A * 10/1995 Bastioli et al. .............. 524/47

FOREIGN PATENT DOCUMENTS

| EP | 0965609 | 12/1999 |
|---|---|---|
| WO | WO-9216584 | 10/1992 |
| WO | WO-9320140 | 10/1993 |

OTHER PUBLICATIONS

Mao, L. et al., "Extruded cornstarch-glycerol-polyvinyl alcohol blends: mechanical properties, morphology and biodegradability", Journal of Polymers and the Environment, vol. 8, No. 4, 2000, pp. 205-211.

*Primary Examiner* — Angela C Scott
(74) *Attorney, Agent, or Firm* — Novak Druce Connolly Bove + Quigg LLP

(57) ABSTRACT

The invention relates to a starch based biodegradable material comprising starch, polyvinyl-alcohol-co-vinylacetate copolymer and at least one plasticizer and to articles obtained therefrom particularly suitable to be injection molded.

31 Claims, 1 Drawing Sheet

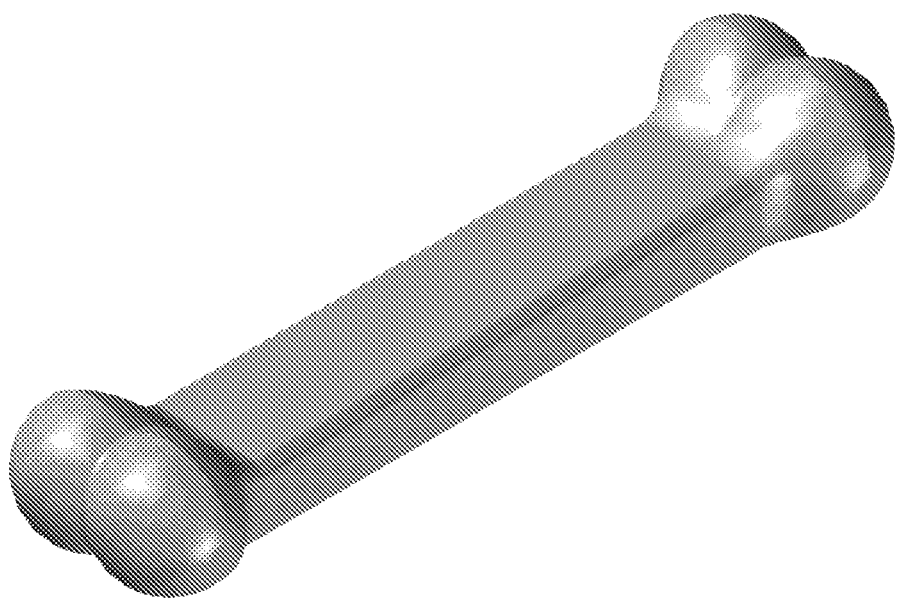

BIODEGRADABLE MATERIAL FOR INJECTION MOLDING AND ARTICLES OBTAINED THEREWITH

CROSS REFERENCE TO RELATED APPLICATIONS

This application is a National Phase filing under 35 U.S.C. §371 of PCT/EP2007/063732 filed Dec. 11, 2007, which claims priority to Patent Application No. MI2006A002374, filed in Italy on Dec. 12, 2006. The entire contents of each of the above-applications are incorporated herein by reference.

The present invention relates to a starch based biodegradable material and to articles obtained therefrom particularly suitable to be injection molded. In particular, the present invention relates to a biodegradable material for injection molding comprising, with respect to the total weight of the composition:
 starch, present in a quantity ranging between 20 and 90%;
 non pre-plasticized polyvinyl alcohol-co-vinyl acetate copolymer present in a quantity ranging between 5 and 50%;
 at least one plasticizer, present in a quantity ranging between 5 and 45%;
characterized by the fact that said polyvinyl alcohol-co-vinyl acetate copolymer has a degree of hydrolysis of >95% and the material presents a viscosity in molten state, measured at T=180° C. and $\gamma_{ap}$=103 s$^{-1}$, of <1200 Pa·s, and a crystallization temperature >105° C. Said injection molded articles are particularly intended for producing articles to entertain animals such as pet toys.

Moreover, said articles are digestible in conditions simulating those of the gastric and intestinal environment.

Surprisingly said articles can be molded according to the injection molding technique, with very short molding cycles, even in the event of considerable thickness.

The material according to the present invention biodegradable according to the ISO 14851 and ISO 14852 standards.

Starch based materials utilized to produce articles to entertain animals are known in the literature. For example, the U.S. Pat. No. 5,419,283 describes a chewable article for animals obtained from a degradable composition comprising a first material chosen in the group constituted by starch, hydrolyzed starch, dextrins derived from starch and mixtures thereof, and a degradable ethylene copolymer selected from the group consisting of polyethylene-acrylic acid, polyethylene-vinyl-alcohol, and mixtures thereof, wherein the weight ratio between said ethylene copolymer and said first material is in the range between 1:6 and 2:1. The copolymer present in the chewable article described in said patent nonetheless has low properties of digestibility in the gastric and intestinal environment. In the event of accidental ingestion of fragments of said article by the animal, this could therefore cause problems linked to the poor digestibility thereof.

Moreover, the polymer mixture described in the U.S. Pat. No. 5,419,283 has properties of low fluidity in the usual processing conditions with injection molding press, which implies a high expenditure of energy during processing with industrial processing plants.

A further disadvantage of the polymer mixture described in the aforesaid patent lies in the fact that it has low crystallization temperatures. Short molding cycles, on industrial injection molding plants, are therefore difficult, with evident negative effects on production.

The object of the present invention is to overcome said limits and in particular to supply a starch based biodegradable material suitable to be processed industrially. Said material is particularly suitable to produce articles to entertain animals provided with properties of digestibility at gastric and intestinal level. These properties would, in fact, be extremely desirable as the entertainment articles according to the invention are susceptible to ingestion by the animal.

A further object of the present invention is to provide a starch based biodegradable material with increased fluidity in injection molding conditions and a higher crystallization temperature, thereby allowing the industrial output to be improved.

The aforesaid objects are attained by means of a biodegradable material comprising starch, a not pre plasticized polyvinyl alcohol-co-vinyl acetate copolymer and at least one plasticizer.

The characteristics and advantages, with respect to prior art, of the biodegradable material according to the invention, and of the articles obtained therewith, will be evident from the description below.

FIG. 1 shows an embodiment of the biodegradable material according to the invention, in the form of a bone for dogs.

The biodegradable material according to the present invention comprises starch, a non-pre-plasticized polyvinyl alcohol-co-vinyl acetate copolymer and at least one plasticizer.

The material according to the present invention does not comprise proteins and hydrogen bond breakers, such as urea.

The term starch is intended herein as all types of starch, namely: flour, native starch, chemically and/or physically modified starch, hydrolyzed starch, destructured starch, gelatinized starch, thermoplastic starch and mixtures thereof. Particularly suitable according to the invention are potato starch, maize starch, wheat starch, pulse, tapioca, yucca and sorghum starch. Maize starch and potato starch are preferred. In the material according to the invention, the dry starch is present in a quantity ranging between 20 and 90%, preferable between 25 and 80%, and even more preferably between 30 and 70% in weight with respect to the total weight of the material.

With regard to the polyvinyl alcohol-co-vinyl acetate copolymer, it is present in a quantity ranging between 5 and 50%, preferably between 10 and 45% and even more preferably between 15 and 35% in weight, with respect to the total weight of the material.

It has a degree of hydrolysis >95%, preferably >97% and even more preferably >99%.

The at least one plasticizer according to the present invention is present in an amount of 5-45%, preferably 10-43% and more preferably 15-40% in weight with respect to the total weight of the material.

Plasticizers are selected in the group of plasticizers not having carboxyl groups. Particularly, said plasticizers are different from compounds having a molecular weight <2000 and at least one carboxyl group and at least one hydroxyl group. Advantageously they comprise water, low molecular weight poly(alkyleneglycols), such as poly(ethylene glycols), poly(propylene glycols), poly(ethylenepropylene glycols); polyols such as glycerol, sorbitol, arabitol, adonitol, xylitol, mannitol, iditol, pentaerythritol, trimethylolpropane and mixtures thereof. Polyols are preferred.

In a particular embodiment of the present invention, the water can be the one contained in the native starch.

In a particular embodiment of the present invention the plasticizers are solid plasticizers at ambient temperature, such as sorbitol and pentaerythritol and their mixtures.

In a preferred embodiment of the compositions according to the present invention the glycerol is present in a quantity >35% with respect to the total weight of the plasticizers.

In a particularly preferred embodiment, glycerin, water and sorbitol are advantageously utilized as plasticizers of the starch and of the polyvinyl alcohol-co-vinyl acetate copolymer. The biodegradable material according to the invention is obtainable by an extrusion process wherein the water is removed prior to the exit from the extruder so that its content with respect to the total weight of the composition is less than 7%, preferably less than 5% measured on the final pellet.

Naturally, other substances can be added to said material, such as colorings, flavorings, food supplements, fibers and process additives such as fluidifying and slip agents but not proteins and hydrogen bond breakers.

The process additives are preferably chosen in the group comprising fatty acid amides such as erucamide, calcium stearate and zinc stearate and are present in a quantity ranging between 0.1 and 5%, preferably between 0.5 and 3% with respect to the total weight of the composition.

The biodegradable material described in the present invention has a viscosity in molten state, measured at T=180° C. and $\gamma_{ap}$=103 s$^{-1}$, <1200 Pa·s, preferably <800 Pa·s, more preferably <600 Pa·s and a crystallization temperature >105° C., preferably >110° C.

The biodegradable material according to the invention therefore has high fluidity which allows improved industrial processability and a high crystallization temperature which translates into an increase in productivity.

The biodegradable material according the present invention are capable to undergo molding cycles shorter than 35 seconds, preferably shorter than 30 seconds and more preferably shorter than 25 seconds.

The articles for entertaining animals obtained from the biodegradable material according to the invention is completely edible and have a digestibility of >80%, preferably >85%, expressed in terms of loss of weight of the sample, in a gastric and intestinal environment.

Particularly noticeable is that the articles made with the compositions according the present invention, when immersed in water at $T_{amb}$ for 3 minutes, are not slippery and do not release sticky residues.

Finally, a further advantage of the aforesaid articles is given by the fact that, when exposed for 12 hours to a T of 23° C., in low humidity conditions (50% RH or under a nitrogen flow), they maintain sufficient breaking energy to avoid self-fracturing. This fact makes the use of costly protective packaging unnecessary.

The biodegradable material according to the present invention is advantageously obtainable by an extrusion process in which the polyvinylalcohol-co-vinylacetate copolymer is not pre-plasticized, proteins and hydrogen bond breakers are not added to the composition and wherein the water content is removed prior to the exit from the extruder so that on the final pellet is <7% preferably <5% with respect to the total weight of the composition.

The biodegradable material according to the invention can also advantageously be used to produce, for example, thermoformed and foamed films/sheets and for lacquer coating and layers of multilayers with other plastic materials, of cellulose or aluminum.

The invention will now be described by means of some embodiments, provided purely by way of example.

EXAMPLE 1

A twin screw extruder with D=30 mm, L/D=35, is supplied with:
  48.8% corn starch (containing 12% water)
  23.7% PVOH-co-vinyl acetate with degree of hydrolysis of 99%
  10.8% glycerol
  15.6% sorbitol
  1.1% calcium stearate Operating conditions of the extruder:
  thermal profile: 30–90–170×7–160×4
  flow rate: 10.1 kg/h
  rpm=170
  active degassing The material delivered from the production line is cut at the head thereof to obtain granules which are air cooled.

The granules thus obtained are characterized by a water content of 4% in weight.

The granules thus obtained are subjected to rheological and thermal characterization tests.

Rheological Characterization

The mixture with the composition as per Example 1 is melted in a capillary rheometer mod. Goettfert (L/D=30) and the viscosity is then measured ($\eta_{ap}$) at T=180° C. and $\gamma_{ap}$=103 s$^{-1}$. A value of $\eta_{ap}$=300 Pa·s is recorded.

Thermal Characterization

DSC analysis of a mixture with a composition as per Example 1 highlights a crystallization temperature of 120.1° C.

Subsequently, the granules obtained according to the process described above are fed to an injection molding press.

The operating conditions of the injection press mod. Sandretto S/7, in which a bone-shaped mold according to the drawing 1 is present, are as follows:
  thermal profile: 140–150–160–170° C.
  injection speed: 40 cm$^3$/s The bone is molded in a 22 second cycle.

The bone thus obtained is subjected to a gastric and intestinal digestibility test and to a soiling test.

Digestibility Test

The test was conducted according to the method of Van Der Meer and Perez. A description of the method of Van Der Meer and Perez is given in the *Journal of the Science of Food and Agriculture*, 1992, vol. 59, no 3, pp. 359-363.

Samples of fragments of bone according to the invention of the weight of 10-20 grams are made to react in pH conditions simulating first the gastric and then the intestinal environment, consecutively.

A weight loss of the sample of >85% is recorded; the residue is soft and easily digestible.

Soiling Test

Bones produced according to the invention were subjected to an experimental test to assess their potential to soil garments or fabrics during their use. After immersion in water for 3 min at $T_{amb}$ it is observed that they are not slippery and do not release sticky residues. Moreover, following rubbing on a black fabric cloth, it is observed that they leave no visible solid residue but a film composed mainly of 93% water. After drying of the cloth only small traces of solid powder are observed.

COMPARISON EXAMPLE 1

The extruder in Example 1 is supplied with:
  49.4% corn starch (containing 12% water)
  18.3% of EVOH
  8.5% of glycerol
  23.4% of sorbitol
  0.4% erucamide Operating conditions of the extruder:
thermal profile: 30-100-170×14
flow rate: 10.1 kg/h
rpm=170
active degassing The material delivered from the production line is cut at the head thereof to obtain granules which are air cooled.

The granules thus obtained are characterized by a water content of 5% in weight.

The granules thus obtained are subjected to rheological and thermal characterization tests.

Rheological Characterization

The mixture with a composition as per Comparison Example 1 is melted in a capillary rheometer mod. Goettfert (L/D=30) and the viscosity is then measured ($\eta_{ap}$) at T=180° C. and $\gamma_{ap}$=103 s$^{-1}$. A value of $\eta_{ap}$=791 Pa·s is recorded.

Thermal Characterization

DSC analysis of a mixture with a composition as per Comparison Example 1 highlights a crystallization temperature of 96° C.

Subsequently, the granules obtained according to the composition and the process as per Comparison Example 1 above are fed to the injection molding press of Example 1 and subjected to a molding cycle in the same operation conditions as Example 1.

The bone is molded in a 38 second cycle.

The bone thus obtained is subjected to a gastric and intestinal digestibility test.

Digestibility Test

The test was conducted according to the method of Van Der Meer and Perez previously mentioned (see Example 1).

A weight loss of the sample of <26% is recorded; the residue is rubbery in consistency, without sharp edges.

COMPARISON EXAMPLE 2

The extruder in Example 1 is supplied with:
35.5% corn starch (containing 12% water)
29.7% PVOH-co-vinyl acetate with degree of hydrolysis of 88%
9.0% of glycerol
12.9% of sorbitol
12.9% of water
Operating conditions of the extruder:
thermal profile: 30-90-170×8-150×4
flow rate: 10.1 kg/h
rpm=170
active degassing The material delivered from the production line is cut at the head thereof to obtain granules which are air cooled.

The granules thus obtained are characterized by a water content of 5% in weight.

The granules thus obtained are subjected to rheological and thermal characterization tests.

Rheological Characterization

The mixture with a composition as per Comparison Example 2 is melted in a capillary rheometer mod. Goettfert (L/D=30) and the viscosity is then measured ($\eta_{ap}$) at T=180° C. and $\gamma_{ap}$=103 s$^{-1}$. ($\eta_{ap}$). A value of $\eta_{ap}$=1229 Pa·s is recorded.

Subsequently, the granules obtained according to the composition and the procedure as per Comparison Example 2 are fed to the injection molding press of Example 1 and subjected to a molding cycle in the same operating conditions as Example 1.

The bone is molded in a 40 second cycle.

The bone thus obtained is subjected to a soiling test.

Soiling Test

Bones produced according to the composition and the process as per Comparison Example 2 were subjected to an experimental test to assess their potential to soil garments or fabrics during their use. After immersion in water for 3 min at $T_{amb}$ it is observed that they become flaky on the surface and release sticky residues.

The invention claimed is:

1. Biodegradable material for injection molding comprising, with respect to the total weight of the material:
   starch, present in a quantity ranging between 25 and 80 wt %;
   non pre-plasticized polyvinyl alcohol-co-vinyl acetate copolymer present in a quantity ranging between 10 and 45 wt %;
   at least one plasticizer, present in a quantity ranging between 10 and 43 wt %;
   wherein said polyvinyl alcohol-co-vinyl acetate copolymer has a degree of hydrolysis of >95%, and said material has a viscosity in molten state, measured at T=180° C. and $\gamma_{ap}$=103 s$^{-1}$, of <1200 Pa·s, and a crystallization temperature >105° C., said plasticizer being selected from the group of polyols, and said material has a water content <7 wt %.

2. The biodegradable material according to claim 1, wherein said starch is present in a quantity ranging between 30 and 70 wt %, said polyvinyl alcohol-co-vinyl acetate copolymer is present in a quantity ranging between 15 and 35 wt %, said plasticizer is present in a quantity ranging between 15 and 40 wt %.

3. The biodegradable material according to claim 1, wherein said polyvinyl alcohol-co-vinyl acetate copolymer has a degree of hydrolysis of >97% and the material presents a viscosity in molten state, measured at T=180° C. and γap=103 s-1, of <800 Pa·s, and a crystallization temperature >110° C.

4. The biodegradable material according to claim 3, wherein said polyvinyl alcohol-co-vinyl acetate copolymer has a degree of hydrolysis of >99% and the material presents a viscosity in molten state, measured at T=180° C. and γap=103 s-1, of <600 Pa·s.

5. The biodegradable material according to claim 1, wherein said starch is maize starch.

6. The biodegradable material according to claim 1, wherein said starch is potato starch.

7. The biodegradable material according to claim 1, wherein said plasticizer is a polyol selected from the group consisting of glycerol, sorbitol, arabitol, adonitol, xylitol, mannitol, iditol, pentaerylthritol, trimethulolpropane and mixtures thereof, and wherein said material further comprises water as a plasticizer.

8. The biodegradable material according to claim 7, wherein said plasticizer is selected from the group consisting of sorbitol, pentaerythritol and mixtures thereof.

9. The biodegradable material according to claim 7, wherein said glycerol is present in a quantity >35% with respect to the total weight of the plasticizers.

10. The biodegradable material according to claim 7, wherein glycerol, water and sorbitol are utilized as plasticizers of the starch and of the polyvinyl alcohol-co-vinyl acetate copolymer.

11. The biodegradable material according to claim 1, wherein said plasticizer is a solid plasticizer at ambient temperature.

12. The biodegradable material as claimed in claim 1, further comprising one or more substances selected from the group consisting of colorings, flavorings, food supplements, fibers and process additives, but not proteins and hydrogen bond breakers.

13. The biodegradable material as claimed in claim 1, further comprising one or more process additives.

14. The biodegradable material as claimed in claim 13, wherein the one or more process additives are present in quantities ranging between 0.1 and 5% by weight with respect to the total weight of the composition.

15. The biodegradable material as claimed in claim 14, wherein said one or more process additives are present in quantities ranging between 0.5 and 3% by weight with respect to the total weight of the composition.

16. The biodegradable material according to claim 13, wherein said one or more process additives is a fluidifying agent, a slip agent, or a combination thereof.

17. The biodegradable material according to claim 16, wherein said one or more process additives is a fatty acid amide, a calcium stearate, a zinc stearate, or a combination thereof.

18. The biodegradable material according to claim 1 obtainable by an extrusion process in which the polyvinylalcohol-co-vinylacetate copolymer is not pre-plasticized, proteins and hydrogen bond breakers are not added to the composition and wherein the water content is removed prior to the exit from the extruder so that the final pellet is less than 7% water with respect to the total weight of the composition.

19. The biodegradable material according to claim 18 in which the water content is removed prior to the exit from the extruder so that the final pellet is less than 5% water with respect to the total weight of the composition.

20. The biodegradable material according to claim 1 capable to undergo molding cycles shorter than 35 seconds.

21. The biodegradable material according to claim 1 capable to undergo molding cycles shorter than 30 seconds.

22. The biodegradable material according to claim 1, capable to undergo molding cycles shorter than 25 seconds.

23. The biodegradable material as claimed in claim 1, utilizable for lacquer coating and layers of multilayers with other plastic materials, of cellulose or aluminum.

24. The biodegradable material according to claim 1, which is biodegradable according to the ISO 14851 and ISO 14852 standards.

25. Injection molded articles obtainable from the biodegradable material according to claim 1.

26. Articles to entertain animals obtained from injection molded articles according to claim 25.

27. The articles to entertain animals according to claim 26, wherein said articles are in the form of a bone.

28. The articles to entertain animals according to claim 27, wherein said articles are completely edible and have a digestibility >80% in terms of loss of weight, in a gastric and intestinal environment.

29. The articles to entertain animals as claimed in claim 28, wherein said articles are completely edible and have a digestibility >85% in terms of loss of weight, in a gastric and intestinal environment.

30. Films, thermoformed, foamed, or both thermoformed and foamed, obtained from the biodegradable material as claimed in claim 1.

31. Thermoformed, foamed, or both thermoformed and foamed films/sheets obtained from the biodegradable material according to claim 2.

* * * * *